United States Patent Office 3,840,618
Patented Oct. 8, 1974

3,840,618
RESIN COMPOSITION
Ettore Da Fano, deceased, late of Palo Alto, Calif., by Marc Da Fano, executor, Glendale, Calif., assignor to PPG Industries, Inc., Pittsburgh, Pa.
No Drawing. Original application Apr. 15, 1955, Ser. No. 501,727, now Patent No. 3,437,715, dated Apr. 8, 1969. Divided and this application Mar. 28, 1969, Ser. No. 812,969
The portion of the term of the patent subsequent to Apr. 8, 1986, has been disclaimed
Int. Cl. C08f 21/00, 21/02
U.S. Cl. 260—863   8 Claims

ABSTRACT OF THE DISCLOSURE

Resin-soluble organic copper salts such as copper naphthenate when added in relatively small amounts function as gelation inhibitors in uncatalyzed unsaturated polyesters and as promoters when catalyst is added. The copper salts are particularly effective when used in conjunction with quaternary ammonium salts of tertiary amine salts as inhibitors.

CROSS-REFERENCE TO RELATED APPLICATION

This is a division of application Ser. No. 501,727 filed Apr. 15, 1955, for Resin Composition, now U.S. Pat. 3,437,715.

This invention relates to resin compositions and has particular reference to polymerizable polyester resin compositions.

One of the principal objects of this invention is to provide novel polymerizable compositions wherein the polymerizable component is a polyester resin.

Another object of this invention is to provide novel polymerizable polyester resin compositions which are stable during extended periods of storage yet which can be readily cured to provide castings which are sound and possess superior optical properties.

Another object of this invention is to provide novel stabilized polymerizable polyester resin compositions which are capable of rapid curing wherein the peak of exotherm is reached sooner than with conventional polyester resins, but wherein the exotherm is substantially lowered.

A further object of this invention is to provide polymerizable polyester resin compositions which in the uncatalyzed condition are stable during extended periods of storage yet which, upon addition of a polymerization catalyst thereto, undergo polymerization at a faster rate than do conventional polyester resins.

Yet another object of this invention is to provide novel polymerizable polyester resin compositions which cure to provide castings having improved physical properties, including hardness, heat distortion point flexural strength and notched-flexural strength.

Other objects and advantages of this invention, it is believed, will be readily apparent from the following detailed description of preferred embodiments thereof.

Certain difficulties are encountered in the manufacture of cast articles from polymerizable polyester resins, particularly in the casting of transparent sheets free of optical distortions, blemishes, etc. One of the most troublesome problems is brought about by the heat of reaction or "exotherm" which is encountered in casting the sheets, especially those ½-inch or greater in thickness. This problem increases not only with thickness of the sheet to be cast, but also with the other two dimensions of the sheet. The rate of gelation required is such that the resulting heat development becomes dangerously rapid, resulting in setting up stresses and strains in the sheet. Moreover, initial temperature differences in various points of the cast article are greatly magnified during the exothermic period, causing uneven shrinkage of the article. Thus, the dimensions of articles which can be cast from polyester resins are greatly limited. In all cases, the casting operation is very critical, requiring strict controls of mold temperature and very accurate timing of the heating operation.

Another problem peculiar to the product of transparent polyester sheets resides in the fact that it is customary to include in commercially available polyester resin compositions a stabilizer or gelation inhibitor, added for the purpose of permitting storage of the resin without the danger of premature gelation or polymerization. However, such inhibitors tend to lengthen the gelation time during casting, often resulting in optical imperfections in the form of striations brought about by convection currents.

Variations in the rate of gelation due to variations in individual batches of polyester resin is another major problem. It is not always possible to correct the differences between two batches of the same type of resin by adjustment of the catalyst system, resulting in aggravation of the difficulties set forth above.

The present invention is designed to provide a polymerizable polyester resin composition which is not subject to the above and other disadvantages heretofore encountered. The invention is based upon the discovery that resin-soluble organic copper salts, when added in relatively small amounts to catalyzed polyester resin compositions, function as promoters to increase the rate of gelation, yet at the same time tend to lower the peak of exotherm. Additionally, such copper salts function as gelation inhibitors when added to uncatalyzed resins, and to supplement the effects obtained with conventional inhibitors.

The present invention is broadly applicable to polymerizable polyester resins. These resins are now conventional in the art and comprise liquid, or at least fusible, polyesters, or mixtures of such polyesters and an ethylenically unsaturated monomer. These resins polymerize to the hard, thermoset stage by heating in the presence of a peroxide catalyst. The polymerization is of the addition type, that is, reaction takes place at the points of carbon to carbon unsaturation, sometimes even in the absence of polymerization catalysts and at room temperature. This is especially true in the case of polymerizable mixtures of polyesters and the ethylenically unsaturated monomers. For example, a polyester of maleic acid or fumaric acid and a glycol such as propylene glycol or di-ethylene glycol in the presence of a monomer such as styrene, unless inhibited, will begin to gel almost at once.

The linear polyester is ordinarily prepared by reaction of an unsaturated dibasic acid with a dihydric alcohol, and frequently, though not necessarily, a saturated dicarboxylic acid or a dicarboxylic acid which is free from ethylenic unsaturation. Typical unsaturated acids which may be utilized include the following:

TABLE A

Maleic acid
Fumaric acid
Aconitic acid
Mesaconic acid
Citraconic acid
Ethyl maleic acid
Pyrocinchoninic acid
Xeronic acid
Itaconic acid
Carbic acid Halogen substituted derivatives of the acids, for example chloromaleic acid, may also be used.

The anhydrides of these acids, where the anhydrides exist, are also within the scope of the term "acid," since the reaction products or polyesters are the same, regardless of whether the acid or anhydride is used. In fact, it is often preferable to utilize the anhydride rather than the free acid. All of these acids are either di- or tricarboxylic and most of them include an ethylenic group attached in alpha-position to at leasat one carboxyl group. That is, they include the group

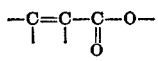

The acids (or anhydrides) which are alpha, beta-ethylenic, alpha, beta-dicarboxylic, such as maleic acid or maleic anhydride, are particularly useful.

The dihydric alcohol component may be selected from the following group:

TABLE B
Ethylene glycol
Diethylene glycol
Triethylene glycol
Polyethylene glycol
1,3-propylene glycol
1,2-propylene glycol
Dipropylene (1,3 or 1,2) glycol
Butylene glycol
Styrene glycol Halogen substituted glycols, for example mono-chloro derivatives, are also useful.

As indicated hereinabove, it is sometimes desirable to utilize a quantity of a saturated dicarboxylic acid or a dicarboxylic acid which is free from ethylenic unsaturation in preparing the polyester. The principal functioning groups in these non-ethylenic acids are carboxyls

which react through esterification. Such acids in the polyester add to the molecular length though they do not crosslink the polyester molecules at points intermediate therein by addition of the monomer. Often such non-ethylenic dicarboxylic acids improve the properties of the resin into which they are introduced. Examples of such acids which may be utilized include the following:

TABLE C
Phthalic acid
Tetrachlorophthalic acid
Succinic acid
Adipic acid
Suberic acid
Azelaic acid
Sebacic acid
Dimethyl succinic acid
Halogenated derivatives of the above acids The term "acid" also includes the anhydrides of the acid. Mixtures of any two or more of these acids may also be used.

In some instances it may also be desirable to include a small amount of a drying oil acid or other monocarboxylic acid in the polyester. The drying oil acids tend to impart air drying characteristics to the polyester or the mixture of the polyester and the ethylenically unsaturated monomer. Drying oil acids which may be used include the following:

TABLE D
Linolenic acid
Linoleic acid
Elaeostearic acid
Octadecatrienoic acid
Clupanodonic acid
Acetic or propionic acid The preparation of the polyester component is carried out substantially as follows: the dihydric alcohols of Table B (which preferably contain no more than 10 carbon atoms) are usually employed in approximate molar equivalency or slightly in excess of such equivalency of the sum of the acids of Tables A, C and D. Usually, this excess will not exceed 10 percent or 20 percent and it may be lower. The excess glycol facilitates reduction of the acid number of the polyester.

The ethylenically unsaturated dicarboxylic acid may constitute the whole of the acid component of the polyester, but usually it is preferred to include at least some of one or more of the non-ethylenic acids from Table C. The amount of acid or acids from the latter table is capable of variation over a broad range. The minimum is, of course, none at all, and the maximum may be 10 or 12 mols per mol of the acid from Table A. Naturally, as the percentage of the acid from Table C is reduced, the polyester assumes more and more closely the character of the polyester containing only acid or acids from Table A. It is impossible to state an absolute minimum to the effective amount of acid from Table C.

A component from Table D is also optional, dependent upon whether an air drying polyester is desired. A range of one mol of acid D to 2 to 12 mols of acids A, or A and C, is ordinarily preferred.

Appropriate ranges of the several components of the polyester may be tabulated as follows:

A—Ethylenic dicarboxylic acid—2 to 12 mols.
C—Non-ethylenically unsaturated dicarboxylic acid—optional, but if present—⅔ to 144 mols.
D—Drying oil acid—optional, but if present—1 mol per 2 to 12 mols A+C.
B—Dihydric alcohol—equivalent or in slight excess of A+C+D.

Conditions of Reaction in Preparing Polyester

In carrying out the esterification of the dihydric alcohol and the acid or acids, conventional principles are adhered to. Acid catalysts may be added. The reaction may be conducted under an atmosphere of carbon dioxide or nitrogen gas. Xylene or other non-reactive solvent may be included and the reaction may be conducted by heating the mixture to reaction temperature, e.g., to that at which water is expelled from the system. It is continued until water ceases to evolve and the acid value of a sample is reasonably low, e.g., 5 to 50. It should not be continued so long as to result in infusibility of the polyester. Usually a temperature of 150° C. to 190° C. or 200° C. and a reaction time of 2 to 20 hours is sufficient to effect the esterification.

The ethylenically unsaturated monomeric compound which is mixed with the polyester to form the polymerizable composition is preferably liquid and usually contains the reactive group $CH_2=C<$ linked to a polar group. Included are the following compounds:

Styrene
Methyl styrene
p-methyl styrene
Divinyl benzene
Indene

Unsaturated esters such as:

Vinyl acetate
Methyl methacrylate
Methyl acrylate
Allyl acetate
Diallyl phthalate
Diallyl succinate
Diallyl adipate
Diallyl sebacate
Diethylene glycol bis (allyl carbonate)
Triallyl phosphate Esters such as those of monohydric or polyhydric alcohols (methyl, ethyl, propyl, allyl, methallyl, vinyl) and an unsaturated polymerizable monocarboxylic acid (acrylic, methacrylic, chloroacrylic)

Esters of monohydric unsaturated alcohols (allyl, vinyl, methallyl, crotyl) and mono or polycarboxylic acids (acetic, propionic, succinic, etc.)

Esters of alpha, beta unsaturated dicarboxylic acids (maleic, fumaric, itaconic) and monohydric alcohols (methyl, ethyl, propyl, isopropyl, amyl)

Any one of these vinylic monomers (including syrupy mixtures of monomer and polymer) may be combined with any of the polyesters prepared from components A and B, A, B and C, A, B and D or A, B, C and D as previously described.

Mixtures of any two or more of the foregoing vinylic compounds and the polyesters can be used.

The vinylic monomer usually will comprise from 10 percent to 60 percent upon a weight basis of the copolymerizable mixture and the mixtures containing 20 percent to 40 percent or 50 percent by weight of monomer are preferred.

Because of the strong tendency of mixtures of polyesters and ethylenically unsaturated monomers to gel prematurely, it is ordinarily necessary to add to the mixture a gelation inhibitor. Many materials have been utilized for this purpose, for example, phenolic compounds such as quinone, hydroquinone, catechols, and the like. However, it has been found that the beneficial effect of the organic copper salts upon a polymerizable polyester resin composition occurs to best advantage when the resin is stabilized with one of two classes of inhibitors. The first and the preferred class of compounds is the quaternary ammonium salts, many of which are now commercially available. These compounds possess the following basic structure:

wherein $R_1$, $R_2$, $R_3$ and $R_4$ are organic radicals and X is an acid radical.

The following are some of the quaternary ammonium salts which function as stabilizers or gelation inhibitors for polymerizable polyesters or mixtures of such polyesters and ethylenically unsaturated monomers:

Trimethyl benzyl ammonium acetate
Trimethyl benzyl ammonium chloride
Trimethyl benzyl ammonium bromide
Triethyl benzyl ammonium chloride
Tripropyl benzyl ammonium chloride
Tributyl benzyl ammonium chloride
Cetyl trimethyl ammonium chloride
Octadecyl trimethyl ammonium chloride
Trimethyl benzyl ammonium sulfate
Lauroyl pyridinium chloride
Phenyl trimethyl ammonium chloride
Tolyl trimethyl ammonium chloride
Benzyl trimethyl ammonium phosphate
Benzyl trimethyl ammonium iodide
Ethyl pyridinium chloride
Phenyl trimethyl ammonium chloride
Octyl trimethyl ammonium bromide
Ethylene bis(pyridinium chloride)
Ethylene bis(trimethyl ammonium bromide)
Trimethyl benzyl ammonium oxalate
Trimethyl benzyl ammonium malate
Trimethyl benzyl ammonium tartrate
Trimethyl benzyl ammonium lactate One important group of quaternary salts comprises those with a benzyl group and three alkyl groups (methyl, ethyl, propyl, butyl, amyl, or the like) directly attached to ammonium nitrogen. These compounds may be represented by the formula:

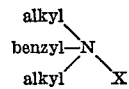

X being an acid radical of an acid at least as strong as acetic acid (dissocation constant $1.75 \times 10^5$).

Another important class comprises quaternary ammonium salts where one hydrocarbon group is higher alkyl and contains at least 8 and up to 18 carbon atoms, and three hydrocarbon groups are lower alkyl containing up to 6 carbon atoms (methyl, ethyl, propyl, butyl, hexyl). The structure of such compound may be represented by the formula:

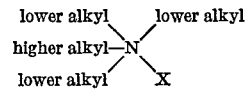

X again being an acid or negative group of an acid at least as strong as acetic acid.

Salts of quaternary ammonium hydroxide can be dissolved in polyesters of alpha, beta-ethylenic alpha, beta-dicarboxylic acids and dihydric alcohols (or their derivatives as modified by dicarboxylic acids and/or drying oil acids) to provide products that can be stored for very long periods without risk of gelation. The stabilizers are preferably added to the polyester while the latter is hot.

The quaternary ammonium type inhibitors are covered by Parker Pat. No. 2,593,787.

A second class of inhibitors useful in combination with metal compounds such as copper naphthenate in polymerizable resin compositions is the tertiary amine salts. The following are some of the inhibitors within this class of compounds:

Trimethylamine hydrochloride
Trimethylamine hydrobromide
Trimethylamine hydroiodide
Dimethylaniline hydrochloride
Dimethylaniline hydrobromide
Triethylamine hydrochloride
Tri-n-butylamine hydrochloride
Tribenzylamine hydrochloride
Tribenzylamine hydrobromide
N Benzylaniline hydrochloride
Benzyl methylamine hydrochloride These materials are incorporated into the polymerizable polyester resin composition in the same manner as the quaternary ammonium compounds.

To formulate stabilized or non-gelling mixtures of (1) an unsaturated polyester of a dihydric alcohol and an acid comprising an alpha, beta-dicarboxylic alpha, beta-ethylenically unsaturated acid and (2) an ethylenically unsaturated monomer, it is preferred to dissolve the quaternary ammonium salt or the tertiary amine salt as an inhibitor in the polyester component. This is best accomplished by adding the salt to the polyester while the latter is hot, for example at about 150° C. or to such other temperature as will effect rapid and complete solution. This can be determined by observation, as it is easy to see when all of the inhibitor has disappeared into the polyester. The inhibitor is usually added in an amount of about 0.01 percent to 2.0 percent by weight of the mixture of components 1 and 2.

The monomeric material is normally added in an amount of about 10 percent to 60 percent by weight of the stabilized polyester mixture. Preferably it is added at a temperature of about 120° C. Since the unsaturated polyesters are usually quite viscous or even solid at room temperature, they should be sufficiently warm to mix with or dissolve in the monomeric compound. The quaternary ammonium compounds and the tertiary amine salts stabilize the copolymerizable mixtures while the ethylenically unsaturated monomer is being incorporated therein. When the mixture is cooled to room temperature, it will remain stable for a considerable period of time.

To cure the polymerizable mixture, a peroxide catalyst is added in an amount of about 0.1 percent to 5 percent by weight of the polymerizable components, and the mixture raised to curing temperature. Typical peroxides which can be utilized include the following.

Low Temperature Types (30° C. to 50° C.)

Acetyl benzoyl peroxide
Peracetic acid
Hydroxyheptyl peroxide
Isopropyl percarbonate
Methyl ethyl ketone peroxide
Cyclohexanone peroxide
Cyclohexyl hydroperoxide
2,4-dichlorobenzoyl peroxide
Cumene hydroperoxide Intermediate Temperature Types (60° C. or above)

p-butyl hydroperoxide
Methyl amyl ketone peroxide
Acetyl peroxide
Lauroyl peroxide
Benzoyl peroxide
Methyl cyclohexyl hydroperoxide
t-butyl permaleic acid
t-butyl perbenzoate
di-t-butyl diperphthalate High Temperature Types (100° C. or above)

t-butyl perphthalic acid
p-chlorobenzoyl peroxide
t-butyl peracetate
di-t-butyl peroxide
dibenzal peroxide Example I An interpolymerizable mixture was prepared comprising (a) two parts by weight of a polyester comprising equal mols of maleic acid and phthalic acid esterified with propylene glycol slightly in excess of stoichiometric amount with respect to the dicarboxylic acids, (b) one part by weight of a $>C=CH_2$ monomer, namely styrene, and (C) a mixture of gelation inhibitors consisting of 0.1 percent by weight of trimethyl benzyl ammonium chloride and 0.001 percent by weight of quinone. Both percentages are based upon the combined weights of polyester and styrene.

A number of sets of samples of this polymerizable mixture were prepared, the samples in a given set being varied with respect to the other samples of the same set by incorporation therein of different polymerization catalysts.

The following catalysts were employed to initiate polymerization of the polyesters and monomers herein disclosed. For convenience, the materials are designated by key letters.

Table 1

A—Benzoyl peroxide
B—Lauroyl peroxide
C—Tertiary butyl hydroperoxide
D—Methyl ethyl ketone peroxide as a 60 percent solution in dimethyl phthalate.
E—Cumene hydroperoxide
F—4 percent solution in carbitol of a 60 percent solution in water of thioacetic acid. This is preferably employed in combination with a peroxidic catalyst.

In each of the examples herein, the total amount of catalyst or mixture of catalysts was 1.0 percent by weight based upon the polyester and monomer.

The composition of the several sets were varied with respect to each other by variations of the content of copper naphthenate incorporated as a control of gel time and/or tank life. The samples in the first set contained no copper naphthenate and the samples of this set constituted controls with which the corresponding samples of the other sets were compared in order to determine the effect of the copper content thereof as a promoter of gelation.

Tests to determine gel time and tank life were conducted upon these samples. The gel tests were conducted in a standard General Electric gel tester at a bath temperature of 150° F. In subsequent examples where gel times were determined this same procedure was followed.

The gel time constitutes a criterion of the rate of cure of the catalyzed mixtures; the shorter the gel time the faster is the rate of cure.

The catalyst content, the copper content (in the form of the naphthenate) and the resultant gel times obtained from the several samples are tabulated as follows:

GEL TIMES FOR COPPER CONCENTRATIONS

| Catalyst 1 percent total based upon resin mixture | TIME in minutes | | | | |
|---|---|---|---|---|---|
| | Sample 1, no copper (control) | Sample 2, 0.008 part per million copper | Sample 3, 0.08 part per million copper | Sample 4, 0.8 part per million copper | Sample 5, 8.0 parts per million copper |
| A | 11.7 | 9.1 | 1.07 | 12.1 | 12.6 |
| C | 4.0 | 4.1 | 3.5 | 1.1 | 2.7 |
| D | 4.1 | 4.2 | 1.9 | 1.9 | 1.2 |
| E | 3.3 | 4.3 | 2.8 | 2.2 | 2.3 |
| B | 3.0 | 3.0 | 1.9 | 7.2 | 8.8 |
| C plus 0.1% of F | 4.0 | 2.25 | 1.85 | 2.7 | 2.6 |

It will be observed that with each of the catalysts, at least at some concentrations, copper has a pronounced synergistic effect, greatly promoting gelation. However, with different catalysts, the amount of copper required to produce maximum promotion tended to vary. In most instances, good results were obtained by use of about 0.08 to 0.8 part of copper per million of resin, although in many cases between about 0.008 and about 8.0 parts of copper per million of resin were effective. More than this amount of copper could be used in some cases, but there is no particular advantage in thus increasing the copper content in conventional resin systems.

It has been observed that even though the rate of gelation is promoted by the copper present in the mixture, the exothermal rise during the polymerization reaction remains relatively low with respect to that taking place in the absence of copper. This is often quite desirable. The proportions of copper as given in the table refer to elemental copper.

The mixtures could be cured by heating to between about 50° C. and about 150° C. for a period of about 3 to 60 minutes, the specific temperatures and times being dependent upon the thickness of the article being formed, and other factors. The article may be further hardened by baking at about 150° C. for 30 to 120 minutes. Good, hard and optically clear resin articles of obvious utility for such uses as the formation of castings of various kinds, as clear sheets of plates, for use in airplane windows and other types of glazing, may thus be formed. The resins may also be mixed with various fillers and fibrous materials, such as fiber glass, in the formation of so-called laminates.

It is a remarkable fact that although the soluble copper compounds, such as copper naphthenate, when employed in extremely small amounts, constitute effective promoters of gelation in the polymerizable mixtures, in many instances, the same compound, even at corresponding concentrations may substantially extend the so-called "tank life" of said mixture. The "tank life" may be regarded as the time the mixture can be stored at about 77° F. after the catalyst has been incorporated into the same before the mixture tends unduly to gel. Long "tank life" is often a desirable property, inasmuch as it is frequently desirable to make up batches which by reason of size, or other causes, must be stored for some ti mebefore use.

The effects of soluble copper upon the "tank life" of a number of the mixtures of this example is illustrated by the following table, wherein the copper is employed in the form of the naphthenate.

TANK LIFE AT 77° F.

| Catalyst 1 percent total based upon resin mixture | TIME in minutes | | | | |
|---|---|---|---|---|---|
| | Sample 1, no copper (control) | Sample 2, 0.008 part per million copper | Sample 3, C.08 part per million copper | Sample 4, 0.8 part per million copper | Sample 5, 8.0 parts per million copper |
| D | 65 | 92 | 41 | 20 | 9 |
| A plus 0.1% F | 5 | 6 | 4 | [1] 6-9 | [1] 0.5-4.5 |
| C plus 0.1% F | 14 | 17 | 7 | [1] 4-8 | [1] 3-7 |

[1] Hours.

Example II

The polyester of this composition comprised 75 parts by weight of maleic anhydride and 25 percent upon a like basis of phthalic anhydride, esterified with propylene glycol in an amount slightly in excess of stoichiometric ratio with respect to the total of the acid. An interpolymerizable mixture was prepared comprising, polyester 2 parts by weight, styrene 1 part by weight, trimethyl benzyl ammonium chloride 0.1 percent based upon the total resin, and quinone 0.0001 percent upon a like basis.

The mixture was divided into two sets of samples, one set being maintained as a control. To the other set was added 0.8 part by weight per million of mixture of copper as the naphthenate. The samples were catalyzed with a number of different catalysts taken from Table 1, and gel times were conducted upon the samples. The results obtained with and without copper naphthenate in the samples are tabulated as follows:

| Catalyst 0.1 percent based upon resin mixture | Gel time in minutes | |
|---|---|---|
| | Sample 6, no copper 150° | Sample 8, 0.8 per million copper, 150° |
| D | 3.8 | 1.7 |
| E | 3.3 | 1.6 |
| A plus 0.1% F | 3.2 | .7 |
| B plus 0.1% F | 2.5 | .8 |

It will be observed that in each instance, there was a substantial reduction in gel time in the mixtures containing copper naphthenate. The latter is a good promoter of gelation when employed in the mixture in an amount of about 0.8. part per million.

EXAMPLE III

The polyester in this example was of a mixture of 2 mols of maleic anhydride and 3 mols of phthalic anhydride. The glycol was propylene glycol utilized in an amount slightly in excess of the stoichiometric equivalency. An interpolymerizable mixture was prepared comprising 67 parts by weight of the foregoing polyester and 33 parts by weight of styrene. The gelation inhibitors in the mixture comprised 0.1 percent by weight based upon the resinifiable mixture of trimethyl benzyl ammonium chloride and 0.009 percent upon a like bases of quinone.

The mixture was divided into two sets of samples; duplicatory catalysts from Table 1 were added to the two sets and to one set was added 0.8 part by million of copper in the form of the naphthenate. Copper was omitted in the other set which constituted a control. Gel time and "tank life" determinations were conducted upon a number of the samples. The results are tabulated as follows:

| Catalyst 0.1 percent by weight | Sample 8 without copper, 150°, gel time | Sample 9 with 0.8 part per million of copper (as naphthenate), 150°, gel time | Sample 10 with no copper, 77°, tank life | Sample 11 with 0.8 part per million of copper (as naphthenate), 77°, tank life |
|---|---|---|---|---|
| A | | | 9¼–15¼ hrs. | 18–22 hrs. |
| B | 22.9 min. | 14.0 min. | | |
| 1 plus 0.1% upon mixture of F. | | | 2¾–6¼ hrs. | 14–18 hrs. |
| B plus 0.1% upon mixture of F. | | | 15 min.–1 hr. | 4¾–8¾ hrs. |
| C plus 0.1% upon mixture of F. | 4.3 min. | 3.4 min. | 1–4 hrs. | 1–1½ hrs. |

It will be observed that in some instances, the addition of copper reduced the gel time and at the same time, the "tank life" was extended, often to a surprising degree. This was especially true in connection with those samples containing F (thioacetic acid) as a promoter. This is a surprising result, inasmuch as it might be expected that a material which would reduce gel time would also reduce the "tank life."

EXAMPLE IV

For this example a polyester was employed which was of about 2.2 mols propylene glycol and equal mols of maleic acid and phthalic acid, together with 0.1 percent by weight based upon the mixture of triphenyl phosphite; 73 pounds of this polyester was mixed with 27 pounds of styrene. The gelation inhibitors comprised 0.1 percent by weight based upon the mixture of trimethyl benzyl ammonium chloride and 0.0025 percent upon a like basis of quinone. Ultraviolet absorbers, namely, o-hydroxyacetophenone and methyl salicylate in the respective amounts of 0.1 percent by weight and 1 percent upon a like basis were added.

To samples of the mixture was added 1 percent by weight based upon the mixture of catalysts selected from Table I, and to one set was added 0.8 part per million of copper in the form of the naphthenate.

A matching set of samples, but without copper, was retained and the two sets were then subjected to gel time determinations as in preceding examples. The results are tabulated as follows:

| Catalyst 1 percent by weight upon mixture | Gel time in minutes | |
|---|---|---|
| | Sample 12 without copper, 150° | Sample 13 with 0.8 part per million of copper, 150° |
| C | 4.4 | 3.3 |
| D | 5.1 | 2.2 |
| E | 4.2 | 2.6 |
| A plus 0.1% on the mixture of F | 3.5 | 1.7 |
| B plus 0.1% on the mixture of A | 2.9 | 1.0 |

In each instance, it was found that the copper in the concentrations indicated, had a pronounced synergistic effect upon the gelation of the mixture. The mixtures could be cast and otherwise formed into articles which could be cured to hard resistant state at temperatures of about 50° C. to 150° C., the time required for cure being from a few minutes to several hours, dependent upon the temperature and the massiveness of the article being formed.

It is also possible to combine a polyester such as one of those disclosed in the foregoing examples or a mixture of such polyesters, with other monomeric materials such as methyl methacrylate. One such polyester resin blend has the following composition:

|  | Mols |
|---|---|
| Adipic acid | 6 |
| Phthalic acid | 4.8 |
| Maleic acid | 5.2 |
| Diethylene glycol | 9.22 |
| Propylene glycol | 7.22 |

Two hundred thirty two and one-half parts of the resulting polyester are then combined with 67.5 parts of styrene, 0.3 part trimethyl benzyl ammonium chloride, 0.004 part quinone, 0.2 part o-hydroxyacetophenone, and 0.16 part of triphenyl phosphite. The resulting polyester resin can be blended with methyl methacrylate and additional styrene to give a composition which is well adapted for casting purposes. It may be catalyzed with any of the peroxygen compounds of Table I, preferably in an amount of about 1.0 percent by weight based upon the blend. A soluble copper compound, such as copper naphthenate, then may be added in an amount such that there is present about 0.008 to about 8 parts per million of the copper. The blend may then be cast or otherwise formed and cured at a temperature in a range of about 50° C. to 150° C.

The copper naphthenate of the above examples may be replaced, in whole or in part, with any other resin-soluble copper salt of an organic acid such as, for example, saturated and unsaturated fatty acids having at least 4 carbons atoms (oleic, linoleic, stearic, palmitic, etc.); acids derived from natural resins (abietic, pimaric, etc.); acids of cyclic saturated hydrocarbons, such as cyclo hexyl carbonic acid; acids of aromatic hydrocarbons, such as benzoic acid; and the like. The resin-soluble copper salt may be formed *in situ* by adding metallic copper to the resin, whereupon the copper reacts with the acidic constituents of the resin itself to produce the salt. Copper salts of strong acids, such as sulfonic acids, keto-acids and acids having halogen atoms near the carboxyl group are not always desirable, at least in the production of articles required to possess optimum optical properties, since such acids may react with certain resin components and affect the optical properties of the finished article.

In addition to the advantages specifically pointed out above, the use of a resin-soluble copper salt permits the casting of sheets which have excellent optical properties, the sheet surfaces being entirely free from blemishes and the sheet interiors being free from "refractive enclosures" of the type which are usually found in sheets cast from conventional compositions. The lowering of the peak of exotherm, brought about by addition of the copper compound, eliminates many of the difficulties encountered in the casting of sheets over ½-inch in thickness, due to even and uniform heating, and adequate dissipation of the heat of reaction. For essentially the same reason, through use of the copper salt, temperature control of the resin and mold during the casting and catalyzing operations becomes less important. Moreover, and again for the same reason, the effect of variations in the reactivity of various production batches of resin is minimized by the addition of copper.

Having fully described my invention, it is to be understood that I do not wish to be limited to the details set forth, but my invention is of the full scope of the appended claims.

What is claimed is:

1. A storage stable copolymerizable mixture consisting essentially of a liquid unsaturated polyester resin, said resin being obtained by the esterification of a compound selected from the group consisting of an alpha, beta-ethylenic dicarboxylic acid and the anhydride thereof with a polyhydric alcohol, a reactive monomeric substance having a $CH_2=C<$ group, at least about 0.01% by weight of a gelation inhibitor selected from the group consisting of phenols, quinones, mono-amine salts and quaternary ammonium salts of non-oxidizing acids at least as strong as acetic acid and a minor effective proportion of at least about 0.008 parts of copper per million parts of said resin and monomeric substance, said copper being in the form of a copper salt which is soluble in the liquid polyester.

2. The mixture of claim 1 wherein the copper salt is copper naphthenate.

3. The mixture of claim 1 wherein said copper is present in an amount of from about 0.008 to about 8 parts per million of said resin and monomeric substance.

4. The mixture of claim 1 wherein said gelation inhibitor comprises a quaternary ammonium salt of a non-oxidizing acid at least as strong as acetic acid.

5. The mixture of claim 1 wherein said gelation inhibitor comprises a phenol.

6. The mixture of claim 1 wherein said gelation inhibitor comprises a quinone.

7. The mixture of claim 1 wherein said gelation inhibitor comprises a mono-amine salt.

8. A storage stable copolymerizable mixture consisting essentially of a liquid unsaturated polyester resin, said resin being obtained by the esterification of maleic acid anhydride with propylene glycol, a reactive monomeric substance having a $CH_2=C<$ group, about 0.01 to 2 percent gelation inhibitor selected from the group consisting of phenols, quinones, mono-amine salts and quaternary ammonium salts of non-oxidizing acids at least as strong as acetic acid and about 0.008 to about 8 parts of copper per million of said resin and monomeric substance, said copper being in the form of a copper salt which is soluble in the liquid polyester.

References Cited
UNITED STATES PATENTS

| 2,472,963 | 6/1949 | Singleton et al. | 260—863 |
|---|---|---|---|
| 2,477,791 | 8/1949 | Foster et al. | 260—861 |
| 2,593,787 | 4/1952 | Parker | 260—865 |
| 2,642,410 | 6/1953 | Hoppens | 260—872 |
| 2,646,416 | 7/1953 | Parker | 260—866 |
| 2,740,765 | 4/1956 | Parker | 260—873 |
| 2,822,344 | 2/1958 | Duhnkrack | 260—863 |
| 2,846,411 | 8/1958 | Meyer et al. | 260—865 |
| 3,437,715 | 4/1969 | DaFano | 260—863 |

HAROLD D. ANDERSON, Primary Examiner

E. A. NIELSEN, Assistant Examiner